United States Patent [19]

Hagen et al.

[11] Patent Number: 4,662,021
[45] Date of Patent: May 5, 1987

[54] DOCKBOARD WITH A TREAD PLATE LOCK MECHANISM

[76] Inventors: James P. Hagen, W322 N6811 Wildwood Pt. Rd., Hartland, Wis. 53029; Walter E. Meyer, 3359 Highway "I", Saukville, Wis. 53090

[21] Appl. No.: 623,920

[22] Filed: Jun. 25, 1984

[51] Int. Cl.⁴ .............................................. E01D 1/00
[52] U.S. Cl. ...................................... 14/71.3; 14/71.7
[58] Field of Search ...................... 14/71.3, 71.7, 72.5; 74/102, 105, 106

[56] References Cited

U.S. PATENT DOCUMENTS

| 2,567,436 | 9/1951 | Lampe | 74/106 |
|---|---|---|---|
| 2,993,219 | 7/1961 | Pennington | 14/71.7 |
| 3,175,238 | 3/1965 | Pennington | 14/71.7 |
| 3,201,813 | 8/1965 | Le Clear | 14/71.7 |
| 3,235,896 | 2/1966 | Riggs | 14/71.3 |
| 3,268,932 | 8/1966 | Hartman | 14/71.3 |
| 3,728,753 | 4/1973 | Beckwith et al. | 14/71.3 |
| 3,835,497 | 9/1974 | Smith | 14/71.3 |
| 3,967,337 | 7/1976 | Artzberger | 14/71.3 |
| 4,047,258 | 9/1977 | Burnham | 14/71.3 |
| 4,224,709 | 9/1980 | Alten | 14/71.3 |
| 4,455,703 | 6/1984 | Fromme et al. | 14/71.3 |

FOREIGN PATENT DOCUMENTS 2321032 11/1974 Fed. Rep. of Germany ....... 14/71.3

Primary Examiner—James A. Leppink
Assistant Examiner—Matthew Smith
Attorney, Agent, or Firm—Ronald E. Barry

[57] ABSTRACT

An independent dockboard of the type adapted to be mounted in a pit in a loading dock, the dockboard including a main frame, a ramp pivotally mounted on the frame and including a tread plate assembly mounted for telescopic movement into and out of the ramp, the tread plate assembly including a tread plate mounted on a frame with a number of wheels for supporting the assembly for movement on the ramp, the tread plate assembly being pivoted about the axis of the wheels, a lift frame pivotally mounted on the main frame and operatively positioned to engage the ramp, a hydraulic piston and cylinder assembly operatively engaging the left frame and a second hydraulic piston and cylinder assembly operatively connected to move the tread plate assembly into and out of the ramp, and an over center toggle link assembly to lock the tread plate against the ramp.

10 Claims, 5 Drawing Figures

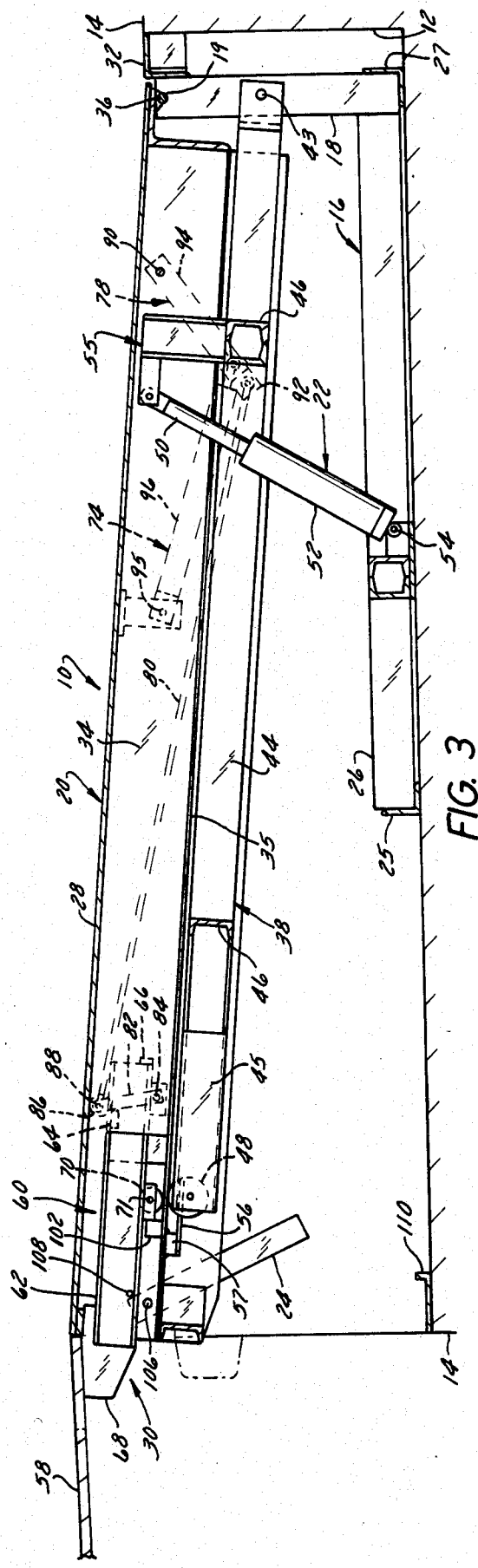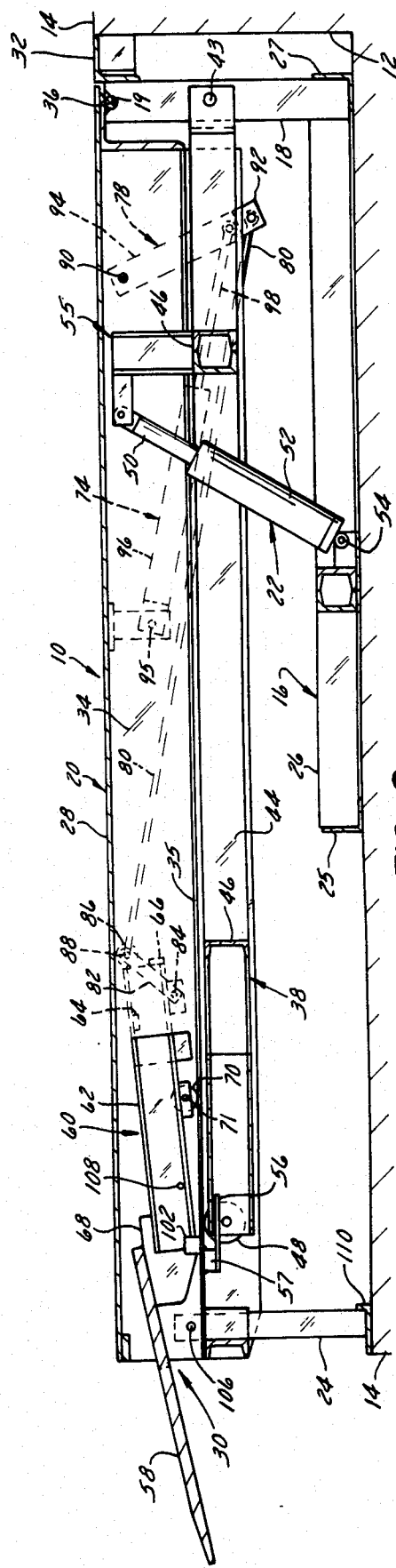

DOCKBOARD WITH A TREAD PLATE LOCK MECHANISM

BACKGROUND OF THE INVENTION

In my copending application entitled, DOCKBOARD ASSEMBLY, Ser. No. 355,688, filed on Mar. 8, 1982, now U.S. Pat. No. 4,455,703 issued on June 26, 1984 an adjustable dockboard was disclosed having a tread plate movable from a storage position within a ramp to an operative position extending partly out of the ramp. The tread plate on the tread plate assembly should be in abutting engagement with the front edge of the ramp. Movement of the tread plate into engagement with the front end of the ramp was dependent upon engagement of the tread plate with the bed of the carrier. The force imposed on the tread plate was absorbed by the wheels on the rear wheel assembly on the carrier assembly. The dockboard had to be provided with mounted fixtures that correspond to those on the loading dock. The cross travel stops for the ramp were permanently mounted on the sides of the pit and the loading dock. This required each dockboard to be specially designed for mounting on each loading dock.

SUMMARY OF THE INVENTION

The improved dockboard according to the present invention is an independent unit which does not require any special mounting arrangement in the loading dock. The ramp is pivotally mounted on a frame so that it can be supported independently in the pit in the loading dock. The ramp can be adjusted to accommodate any depth of dock by merely adjusting the length of the vertical pivot supports for the ramp on the frame. The tread plate assembly includes a unique overcenter toggle arrangement for locking the tread plate in the operative position so that the tread plate remains in engagement with the front edge of the ramp at all times. The dockboard has the capability of moving the front edge of the lip or tread plate to a height 16 inches above the dock level and 20 inches below dock level.

IN THE DRAWINGS

FIG. 2 is a side elevation view in section showing the ramp in the cross travel position.

FIG. 3 is a view similar to FIG. 2 showing the ramp in the elevated position.

DESCRIPTION OF THE INVENTION

Figure 1:
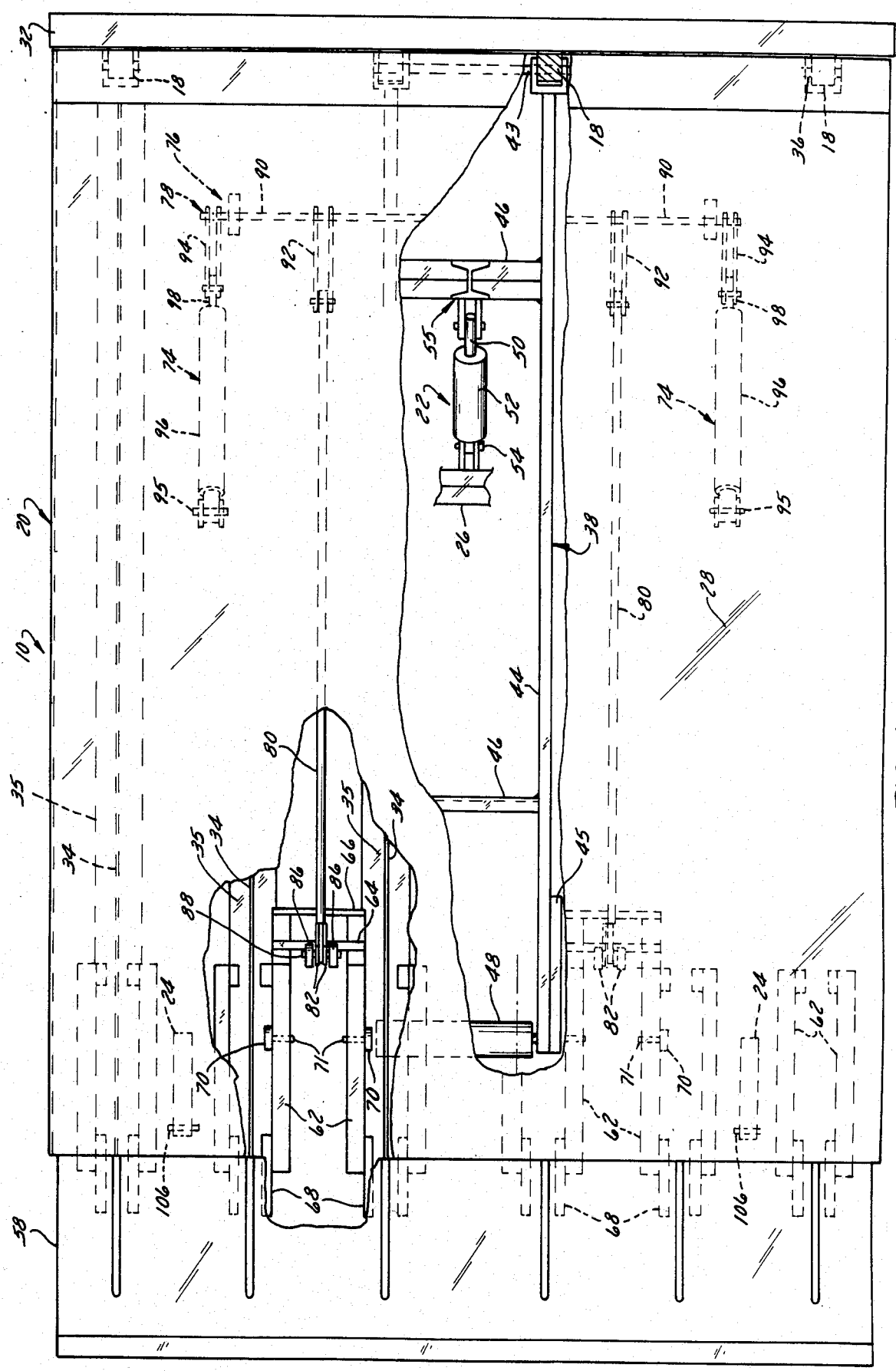
FIG. 1 is a top plan view of the dockboard partly broken away to show drive assemblies for the ramp and tread plate assembly.

As seen in the drawings, the dockboard 10 according to the invention is an independent unit which can be positioned within a recess or pit 12 of any depth provided in a loading dock 14. The dockboard 10 includes a main frame 16 having vertical ramp support members 18 for supporting a ramp 20 for pivotal movement with respect to the upper surface of the loading dock 14. Each of the support members 18 includes a notch 19 at the upper end. The ramp 20 is pivoted with respect to the main frame 16 by means of a primary hydraulic piston and cylinder assembly 22 between a storage position level with the dock and an operative position for engaging the bed of a carrier. The ramp 20 is located in a cross-travel position by means of travel stop members 24 when in the storage position.

Figure 4:
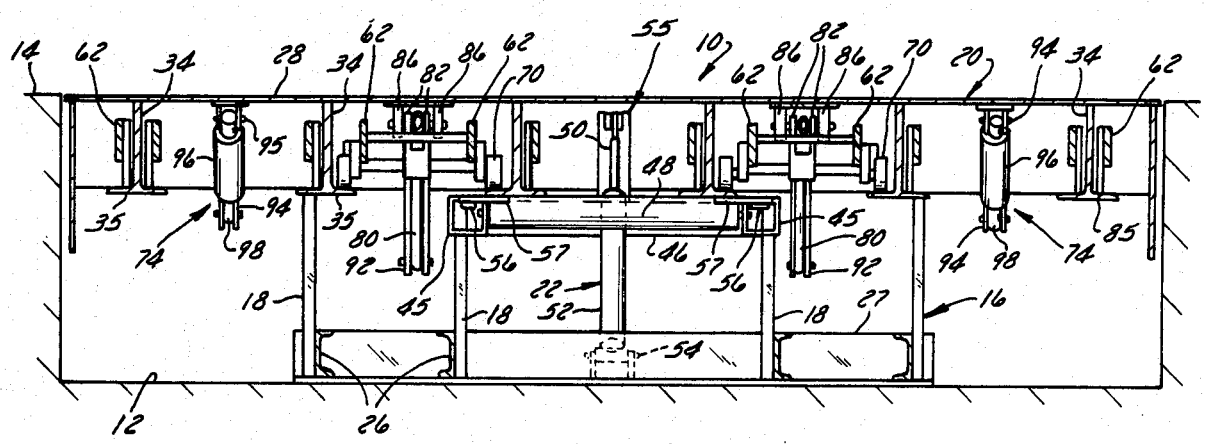
FIG. 4 is a front cross sectional view taken on line 4—4 of FIG. 1.
Figure 5:
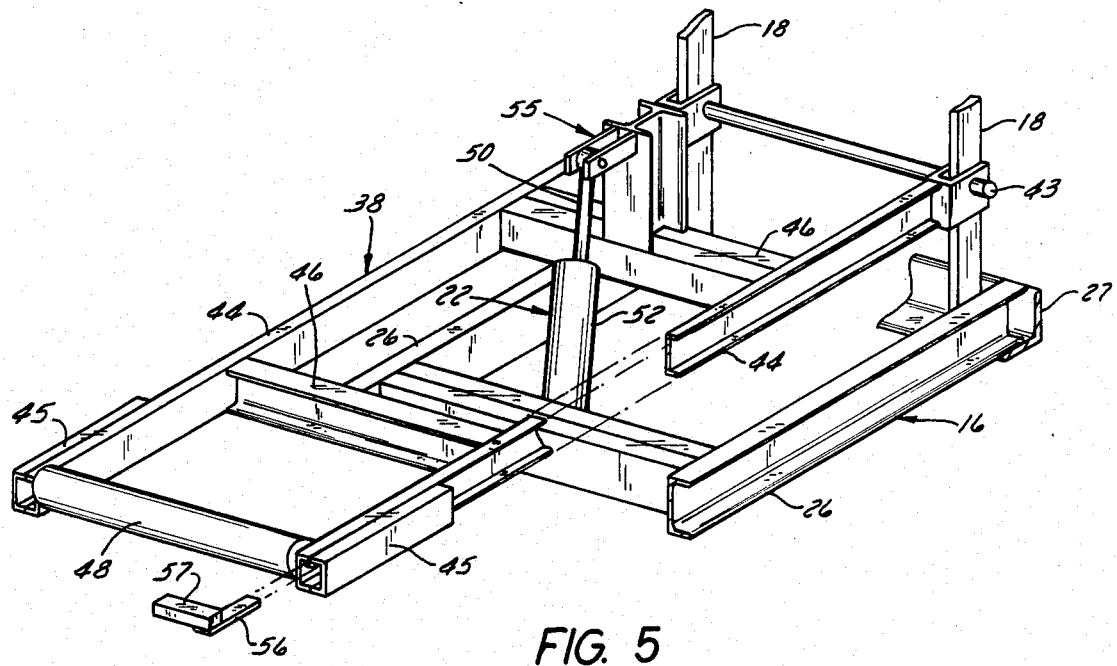
FIG. 5 is a perspective view of the lift frame.

Referring to FIGS. 4 and 5, the frame 16 includes a pair of channel members 26 held in a parallel-spaced relation by angle irons 25, 27 secured to the ends of the members 26. The ramp 20 is supported for pivotal movement on the vertical support members 18 which are secured to the angle iron 27.

The ramp 20 includes a deck plate assembly 28 and a tread plate assembly 30. The plate 28 has an outer dimension corresponding to the top of the pit 14. Means are provided for reinforcing the plate 28 in the form of a number of beams 34 secured in a parallel spaced relation to the bottom of the plate 28. Each of the beams 34 includes a bottom plate 35 secured to the bottom edge of the beam. The ramp is supported in the notches 19 by means of a pivot rod 36 secured to the rear edge of plate 28. An angle iron 32 secured to the back of member 18 bridges the gap between the dockboard and the loading dock.

Means are provided for raising and lowering the ramp 20. Such means is in the form of a lift frame 38 which includes a pair of channel members 44 having cross members 46 connected to the inside and a roller 48 at the outer end. The sides of the channel members 44 on the roller end of the frame are closed by channel member sections 45 to form a box beam. The members 44 are pivotally connected to vertical members 18 by pivot shaft 43.

The lift frame 38 is moved by the primary hydraulic piston and cylinder assembly 22 which includes a piston 50 and a cylinder 52. The cylinder 52 is secured to a shaft 54 mounted in the main frame channel members 26. The piston 50 is connected to the lift frame 38 by means of a beam assembly 55 mounted on a pair of channel members connected between the channel members 44. The beam assembly 55 is required to provide sufficient space to accommodate the motion of the piston and cylinder assembly 22. Actuation of the hydraulic piston and cylinder assembly 22 will force the roller 48 against the bottom of the plates 35 on the two center beams 34 to pivot the ramp 20 upward about the rod 36.

Means are provided on the plates 35 to hold the lift frame 38 against the plates 35. Such means is in the form of a plate 56 secured to a block 57 on the bottom of the plate 35. The plate 56 extends into the ends of channel members 44 and 45 so that the ramp 20 and lift frame 38 move up and down as a unit.

The tread plate assembly 30 includes a plate or lip 58 secured to a pair of support assemblies 60 for movement into and out of the ramp 20. In this regard, each of the support assemblies 60 includes a pair of frame members 62 connected at one end by cross bars 64 and 66. The other end of the members 62 being connected to the tread plate 58 by mounting blocks 68. The support assemblies 60 are supported for movement on plates 35 by wheels 70 mounted on axles 71 provided on the sides of each of the members 62. The tread plate 58 is supported at an angular relation to the deck plate 28 by means of the blocks 68 to form a lip which rides on the bed of the carrier.

The tread plate assembly 30 is moved into and out of the ramp by means of a drive assembly which includes a double acting hydraulic piston and cylinder assemblies 74 and a drive mechanism 76. The drive mechanism 76 includes a rocker assembly 78, a pair of drive rods 80 and a pair of toggle links 82 mounted on the support assemblies 60. Each of the toggle links 82 is pivotally mounted on one of the support assemblies 60 by a pivot shaft 84. A pair of rollers 86 mounted on axles 88 are provided on links 82. One end of each of the rods 80 is connected to one of the axles 88 for the rollers 86. The other end of the rods 80 are connected to the rocker assembly 78.

The rocker assembly 78 includes a rod 90 pivotally mounted on the beams 34 under plate 28. A pair of lever arms 92 are mounted on the rod 90 corresponding to the drive rods 80 and a drive arm 94 is mounted at each end of the rod 90. The drive rods 80 are connected to the lever arms 92.

The piston and cylinder assemblies 74 are operatively connected to each of the drive arms 94 to move the tread plate assembly into and out of the ramp 20. In this regard, each assembly 74 includes a cylinder 96 having one end connected to the bottom of plate 32 by means of a pin 95 and a piston 98 connected to a drive arm 94. On actuation of the pistons 98, as seen in FIG. 3, the tread plate assembly will move outward from the ramp. The drive rods 80 will push the links 82 outward forcing the rollers 86 to bear against the bottom of ramp plate 28. The tread plate assembly 30 will move outward until the rollers 70 engage a stop block 102 located on the plates 35. Continued force applied by the rods 80 to the axle 88 of the rollers 86 will pivot the links 82 about shaft 84 forcing the support assemblies 60 to pivot about the axis of the wheels 70 until the back edge of the tread plate 58 engages the end of the plate 28 as seen in FIG. 3. The links 82 will pivot past the axis of shaft 84 locking the tread plate assembly in the operative position with the tread plate abutting the edge of the deck plate 32. Although two assemblies 74 are shown, a single assembly 24 can be used in some instances.

The ramp 20 is normally left in the cross travel position when not in use. This is accomplished by means of the cross travel members 24 mounted on pins 106 on each side of the ramp. Each cross travel member 24 is formed from a channel member which is pivotally mounted on a pin 106 provided on the beams 34. The cross travel stops are moved out of the downward path of motion of the ramp by pins 108 provided on the tread plate assembly in a position to engage the upper end of rods 106. When the tread plate assembly 30 is moved into the storage position, the travel stop member will be free to pivot on pins 106 to a generally vertical position for engagement with plate 110.

CYCLE OF OPERATION

The ramp 20 is normally stored in a cross travel position with the travel stop members 24 seated on plates 110. In operation, the ramp 20 is raised by starting the hydraulic system to pump hydraulic fluid to the piston and cylinder assembly 22 through a three-way valve. As the piston 50 moves outward, the lift frame 38 will pivot the ramp 20 upward until the piston reaches the end of its stroke. The roller 48 will engage a micro switch on one of the plates 35 to open the hydraulic line through the three-way valve to the piston and cylinder assemblies 74. The tread plate assembly will move outward until the tread plate is locked against the edge the deck plate 32. Once the toggle link 82 has moved over center of the axis of shaft 84, a micro switch is actuated by roller 86 to stop the pump. A bleed valve is opened in cylinder 52 to allow the piston 54 to be pushed into the cylinder by the weight of the ramp. The ramp will stop when the tread plate 58 rests on the bed of a carrier. The end of tread plate 58 can rise approximately 16 inches above the loading dock and drop 20 inches below the loading dock.

It should be noted that the travel stop members 24 have been moved out of the path of downward motion of the ramp by the outward motion of the tread plate assembly. Also the lift frame 38 is prevented from continuing its downward motion by the plate 56 which is in engagement with the channel members 44 and 45.

When the carrier moves out from under the tread plate 58, the ramp 20 will be free to drop to the lower most position in the loading dock. Since the lift frame 38 was prevented from dropping away from the ramp by plate 56, the movement of the ramp will be cushioned by the hydraulic fluid remaining in the cylinder which will be bled out of the cylinder by the weight of the ramp forcing the hydraulic fluid back to the reservoir. When the ramp reaches the bottom of its downward motion, a micro switch will be closed to start the hydraulic pump. Initially, the hydraulic fluid will be pumped to the piston and cylinder assemblies 74 to draw the tread plate assembly 30 into the ramp. Once the assembly 30 has been fully withdrawn, a micro switch is actuated to pressurize cylinder 52 to raise ramp 20. As soon as the ramp rises above the dock level, roller 48 will engage a micro switch to turn off the pump, open the bleed valve, and allow the ramp to settle on the travel stop members 24.

The embodiments of the invention in which an exclusive property or privilege is claimed, are defined as follows:

1. A dockboard adapted to be mounted in a pit in a loading dock, said dockboard including
    a main frame,
    a ramp pivotally mounted on the frame,
    means for pivoting said ramp with respect to said frame,
    a tread plate assembly mounted in said ramp for linear movement between a storage position within said ramp and an operable position forming a continuation of said ramp,
    means for moving said tread plate assembly between the operative and storage positions, and
    means connected between said tread plate assembly and said moving means for locking said tread plate in the operative position.

2. The dockboard according to claim 1 including
    a lift frame pivotally mounted on said main frame,
    a roller mounted on the lift frame to operatively engage said ramp, and
    a hydraulic piston and cylinder assembly mounted on said main frame and being operatively connected to said lift frame at a point intermediate the lift frame pivot and said roller, whereby the ramp is raised at a rate faster than the rate of movement of the hydraulic piston and cylinder assembly.

3. The dockboard according to claim 1 or 2 wherein said locking means includes
    a toggle link operatively connected to the tread plate assembly.

4. The dockboard according to claim 1 or 2 wherein the tread plate assembly includes
    a pair of support assemblies, each including a pair of frame members,
    a number of rollers mounted on said frame members for supporting said tread plate assembly for movement in said ramp, and
    a tread plate mounted at an angle on said frame members, said locking means including a toggle link pivotally mounted on each support assembly for pivoting said frame members about the axis of said rollers to move the tread plate into engagement with said ramp when the tread plate is in the operative position.

5. The dockboard according to claim 4 wherein said toggle link includes
a pair of rollers positioned to ride on the bottom of the deck plate.

6. A dockboard adapted to be mounted in a pit in a loading dock, said dockboard including
a main frame including a number of vertical members having a length equal to the height of a dockboard pit,
a ramp pivotally mounted on the vertical members for movement from a cross travel position level with the dock to a position above the bed of a carrier,
a first hydraulic piston and cylinder assembly mounted on said frame for pivoting said ramp with respect to said vertical members,
a tread plate assembly mounted in said ramp for linear movement between a storage position in said ramp and an operable position forming a continuation of said ramp, said assembly including a tread plate,
a second hydraulic piston and cylinder assembly for moving said tread plate assembly between the operative and storage positions, and
means connected between said second piston and said assembly for locking said tread plate assembly in the operative position with the tread plate in engagement with said ramp.

7. The dockboard according to claim 6 including
a lift frame pivotally mounted on said main frame,
a roller mounted on the lift frame to operatively engage said ramp,
said first hydraulic piston and cylinder assembly being mounted in a position to operatively engage said lift frame at a point intermediate to the lift frame pivot and
said roller, whereby the ramp is raised at a rate faster than the rate of movement of the hydraulic piston and cylinder assembly.

8. The dockboard according to claims 6 or 7 wherein said locking means includes
a toggle link operatively connected to said tread plate assembly.

9. The dockboard according to claims 6 or 7 wherein said tread plate assembly includes
a pair of support assemblies, each including a pair of frame members, a number of rollers mounted on said frame members for supporting said tread plate assembly for movement on said ramp,
said tread plate being mounted at an angle on said frame members
said locking means including a toggle link pivotally mounted on each support assembly for pivoting said frame members about the axis of said rollers to move the tread plate into engagement with said ramps when the tread plate is in the operative position.

10. The dockboard according to claim 8 wherein said toggle link includes
a pair of rollers positioned to ride on the bottom of the deck plate.

* * * * *